Dec. 16, 1930.  J. A. ORTIZ  1,785,423
SNOW HAULING TRUCK
Filed Dec. 7, 1929   4 Sheets-Sheet 1
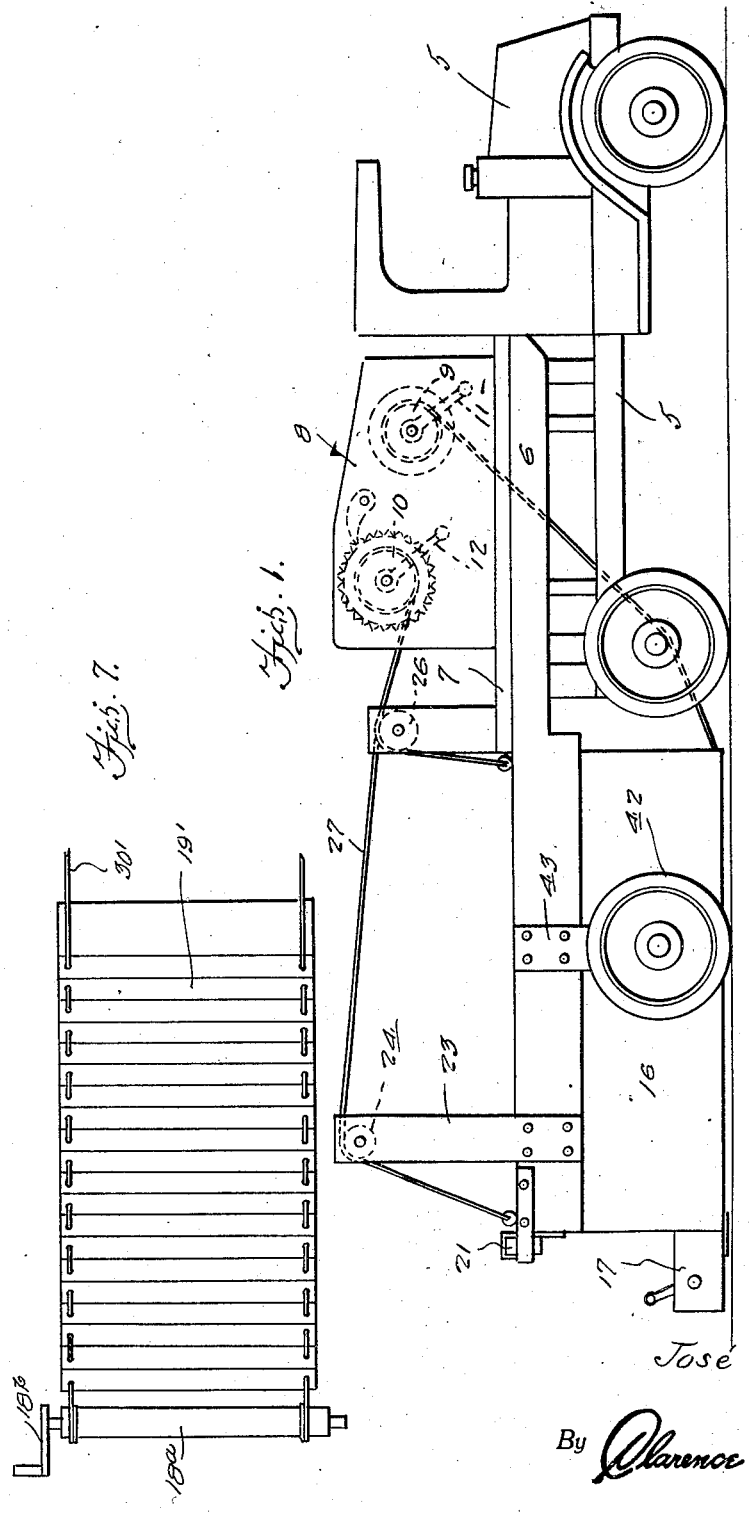
Inventor
José Angel Ortiz
By Clarence A. O'Brien
Attorney

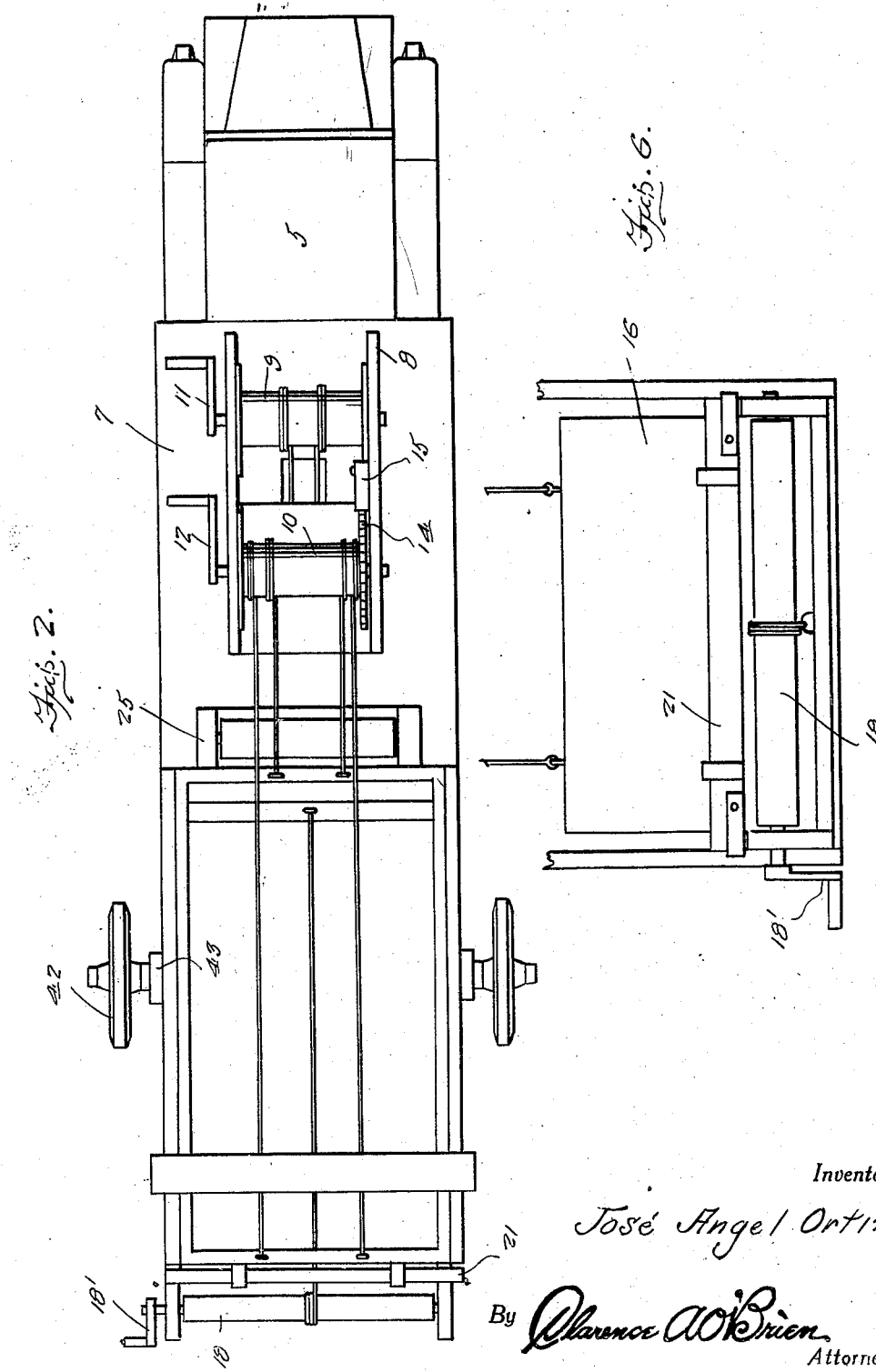

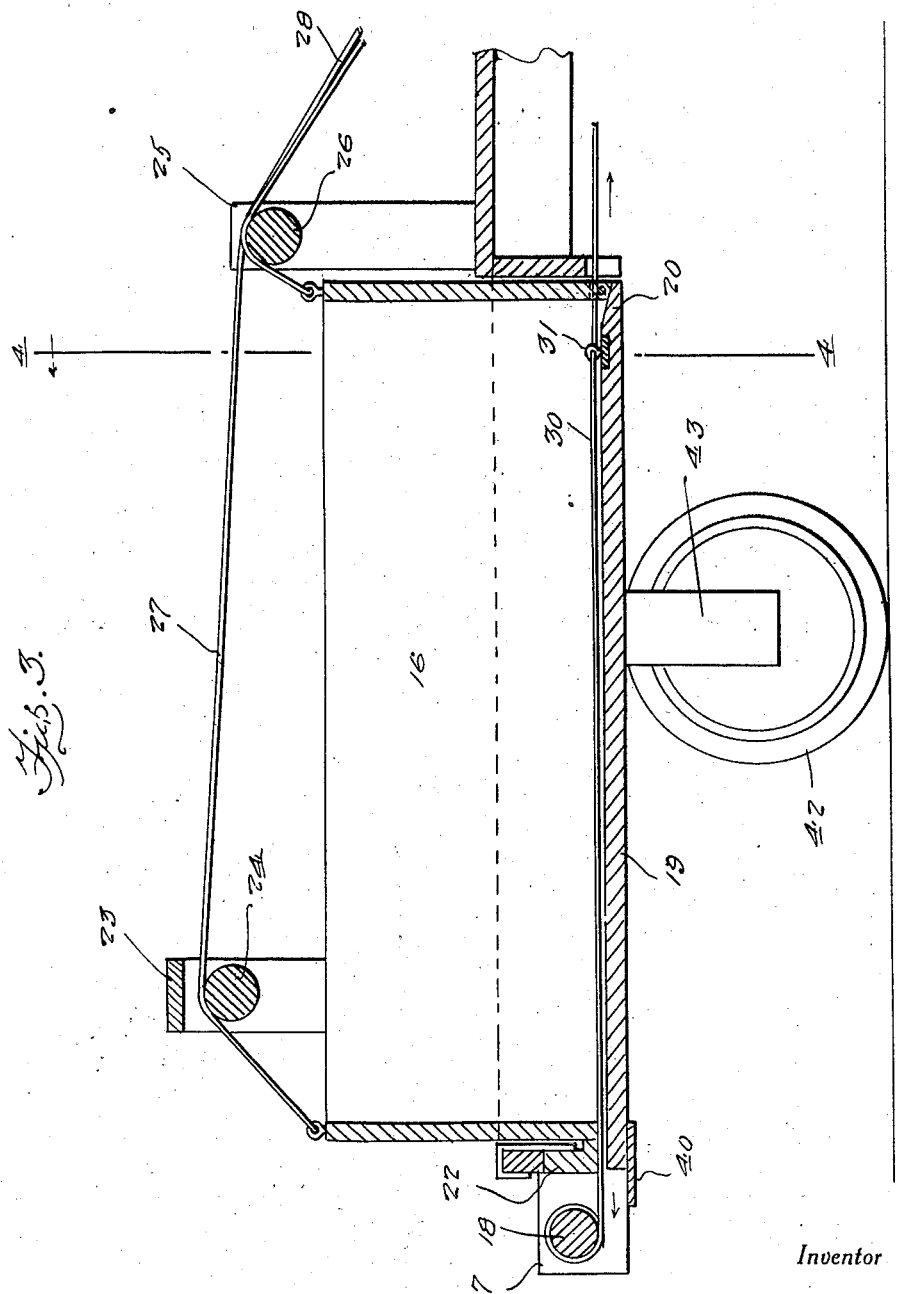

Dec. 16, 1930.  J. A. ORTIZ  1,785,423
SNOW HAULING TRUCK
Filed Dec. 7, 1929   4 Sheets-Sheet 4
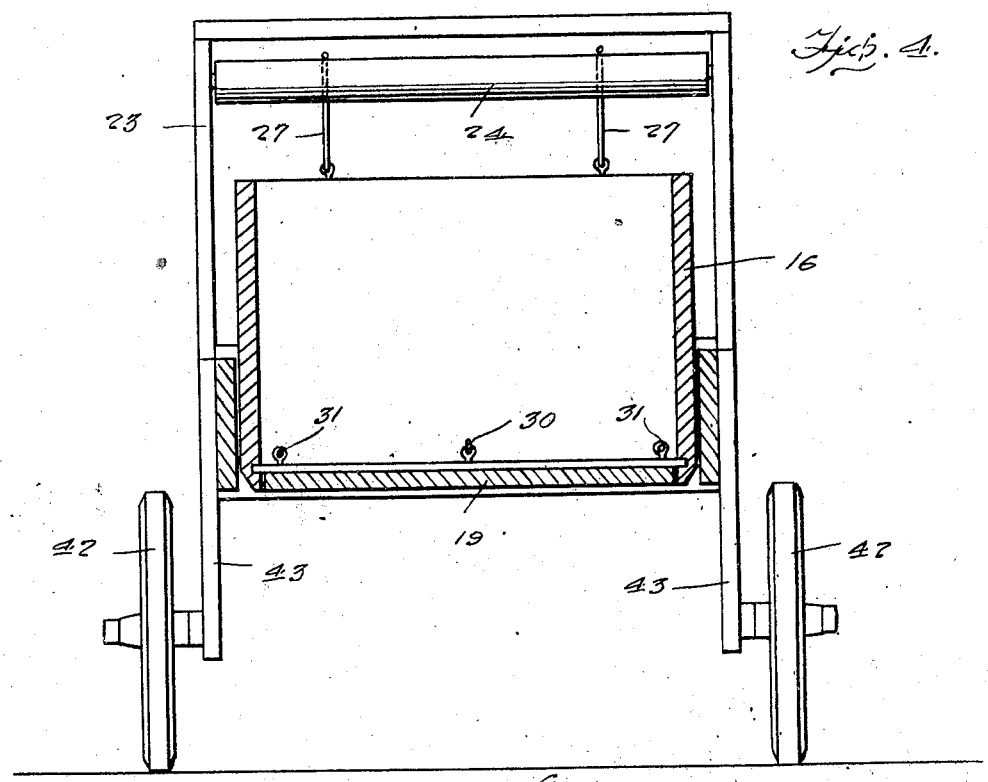
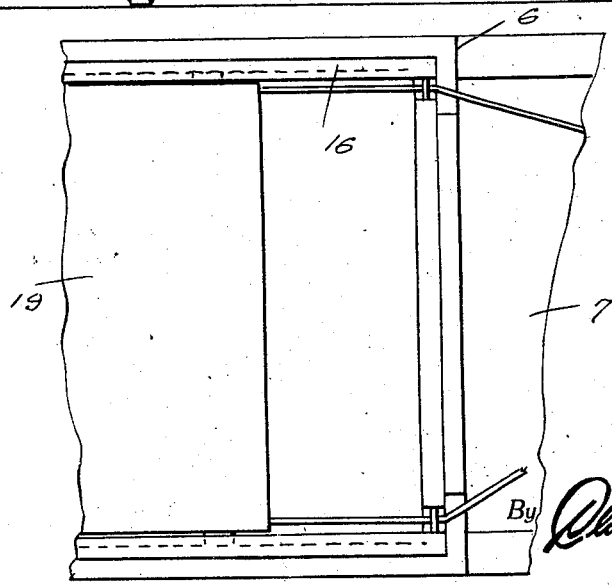
Inventor
José Angel Ortiz
By Clarence A. O'Brien
Attorney Patented Dec. 16, 1930

1,785,423

UNITED STATES PATENT OFFICE

JOSÉ ANGEL ORTIZ, OF NEW YORK, N. Y.

SNOW-HAULING TRUCK

Application filed December 7, 1929. Serial No. 412,454.

The present invention relates to a truck for hauling snow and the like and has for its prime object to provide a truck of this nature which has a body which may be lowered over a pile of snow or the like and the bottom moved under the pile and then the body may be lifted up to its normal position.

Another very important object of the invention resides in the provision of a structure of this nature which is comparatively simple in its details, strong and durable, easy to manipulate, compact and convenient, thoroughly efficient and reliable in use and operation, and otherwise well adapted for the purpose for which it is designed.

With the above and numerous other objects in view as will appear as the description proceeds the invention resides in certain novel features of construction, and in the combination and arrangement of parts as will be hereinafter more fully described and claimed.

In the drawing:

Figure 1 is a side elevation of a truck embodying the features of my invention showing the body lowered, Figure 2 is a top plan view thereof, Figure 3 is a vertical longitudinal section through the rear end of the truck showing the body raised, Figure 4 is a vertical transverse section taken substantially on the line 4—4 of Figure 3, Figure 5 is a fragmentary top plan view showing the front end of the body with the bottom partially opened.

Figure 6 is a fragmentary rear elevation, and

Figure 7 is a plan view of a modified form of bottom.

Referring to the drawing in detail it will be seen that the numeral 5 denotes a truck of any preferred construction on which is mounted a frame 6 extending rearwardly beyond the truck. A platform 7 is mounted on the front portion of the frame 6 and plates 8 rise therefrom and have journalled therebetween drums 9 and 10 operated respectively by cranks 11 and 12.

A toothed wheel 14 is rotatable with the drum 10 and a pawl 15 is rockable on one of the plates 8 to engage this wheel portion. In the rear portion of the frame 6 there is a rectangular body 16 from the rear bottom end of which project plates 17 between which is journalled a drum 18. A bottom 19 is slidable longitudinally between the bottom ends of the sides of the body 16 and the front edge is beveled as at 20 forming a knife edge.

A stop structure 21 extends from the rear of the frame 6 so as to be abutted by a cross member 22 between the plate 17 when the body is in a raised position as clearly shown in Figure 3. An arch 23 rises from the rear portion of the frame and has journalled therein a roller 24.

Standards 25 rise from an intermediate portion of the frame and have journalled therebetween a roller 26. Cables 27 and 28 are anchored on the rear and front walls respectively of the body 16. The cable 27 is trained over the roller 24 and the roller 26. The cable 28 is trained over the roller 26. These cables extend forwardly and are windable on the drum 10 for raising and lowering the body 16.

Cables 30 have intermediate portions anchored as at 31 to a forward part of the bottom 19 and extend along the top of the bottom and are windable on drums 18 and 9. Crank 18' is on the drum 18. By actuating the drum 18 by the crank 18' the cables 30 may be wound on the drum 18 so as to move the bottom 19 rearwardly over a plate 40 disposed under the plate 17 so that the contents of the body 16 may be dumped or so that the body 16 may be lowered over a pile of snow by releasing the pawl 15 and unwinding the cables 27 and 28 from the drum 10.

Presuming that the body 16 is over a pile of snow it will be seen that by winding the cables 30 on the drum 9, the bottom may be moved forwardly under the pile of snow and then by winding the cables 27 and 28 on the drum 10 the body containing the pile of snow may be raised to the proper position for hauling the same.

The rear portion of the frame is preferably supported by wheels 42 mounted on standards 43 depending from the rear side portions of the frame 6.

In Figure 7 it will be seen that cables 30' are equivalent to cables 30 and are trained through the ends of a plurality of slats 19' forming a bottom so that this bottom may be wound on the drum 18a by the crank 18b.

It is thought that the construction, operation, utility and advantages of this invention will now be quite apparent to those skilled in this art without a more detailed description thereof.

The present embodiment of the invention has been described in considerable detail merely for the purposes of exemplification since in actual practice they attain the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an apparatus of the class described, a wheeled truck, a frame on the truck having an opening, a body mounted in the opening in the frame, means for lowering and raising the body through said opening, a bottom closure in the body having a knife edge at its inner end, means movably mounting the bottom closure, and means for sliding the bottom structure to open and closed position.

2. In an apparatus of the class described, a wheeled truck, a frame on the truck having an open portion extending rearwardly of the truck, a body movable through the opening in the said rear portion of the frame, drum and cable means on said frame for raising and lowering the body through the said open portion of the frame, a bottom slidable longitudinally of the body, cable and drum means for sliding the bottom to closed and open position, and means for limiting the upward movement of said body through said open portion of the frame.

3. In an apparatus of the class described, a wheeled truck, a frame on the wheeled truck extending rearwardly, a platform on the front portion of the frame, plates rising from the platform, a pair of drums journaled between the plates, a pair of rollers, means for supporting the rollers above the frame, a body in the rear portion of the frame movable vertically therein, cables engaged with said body and trained over said rollers and windable on one of the drums, a bottom movable longitudinally in the body, a cable attached to the bottom and trained over the other drum so that the bottom may be moved to a closed position.

4. In an apparatus of the class described, a wheeled truck, a frame on the wheeled truck extending rearwardly, a platform on the front portion of the frame, plates rising from the platform, a pair of drums journaled between the plates, a pair of rollers, means for supporting the rollers above the frame, a body in the rear portion of the frame movable vertically therein, cables engaged with said body and trained over said rollers and windable on one of the drums, a bottom movable longitudinally in the body, a cable attached to the bottom and trained over the other drum so that the bottom may be moved to a closed position, a drum, means for journalling the last mentioned drum rearwardly of the body, said last mentioned cable being extended and windable over the last mentioned drum so that the bottom may be slid to an open position.

5. In a snow hauling truck, a wheeled frame, a box like body mounted in said frame for vertical raising and lowering movement therethrough, said body being open at its bottom end and having guide means adjacent said open bottom end, a flexible slatted closure member slidable in said guide, a roller adjacent one end of said guide means and means for winding and unwinding said closure member with respect to said roller for alternately moving it into and out of closing position relative to said open bottom end of the body.

In testimony whereof I affix my signature.

JOSÉ ANGEL ORTIZ.